United States Patent [19]
Johnson

[11] Patent Number: 5,651,880
[45] Date of Patent: Jul. 29, 1997

[54] WATER SOFTENER BRINE TANK INSERT

[76] Inventor: Stanley O. Johnson, 184 State St., Oregon, Wis. 53575

[21] Appl. No.: 710,362

[22] Filed: Sep. 16, 1996

[51] Int. Cl.$^6$ .............. B01D 24/46; C02F 5/00; C02F 1/42
[52] U.S. Cl. .............................. 210/126; 210/190
[58] Field of Search ...................... 210/190, 126

[56] References Cited

U.S. PATENT DOCUMENTS

| | | | |
|---|---|---|---|
| 146,590 | 1/1874 | Heinz | 210/285 |
| 364,599 | 6/1887 | Morris | 210/286 |
| 576,452 | 2/1897 | Hart | 210/286 |
| 1,090,283 | 3/1914 | Crandall | 210/286 |
| 1,140,726 | 5/1915 | Warden | 210/286 |
| 1,430,950 | 10/1922 | Crandall | 210/285 |
| 1,940,965 | 12/1933 | Nash | 210/190 |
| 2,253,685 | 8/1941 | Burckhalter | 210/286 |
| 2,680,714 | 6/1954 | Carlsson et al. | 210/190 |
| 2,805,922 | 9/1957 | Nickols | 210/190 |
| 3,073,674 | 1/1963 | Rudelick | 23/112 |
| 3,123,445 | 3/1964 | Heath | 210/190 |
| 3,334,044 | 8/1967 | Satterlee | 210/190 |
| 3,342,336 | 9/1967 | Rose | 210/134 |
| 3,476,247 | 11/1969 | Rose | 210/95 |
| 3,620,371 | 11/1971 | Valdespino | 210/117 |
| 3,684,457 | 8/1972 | Pinto et al. | 210/190 |
| 3,687,289 | 8/1972 | Tischler | 210/89 |
| 3,762,550 | 10/1973 | Jarr et al. | 210/190 |
| 4,026,801 | 5/1977 | Ward | 210/140 |
| 4,228,000 | 10/1980 | Hoeschler | 210/673 |
| 4,235,340 | 11/1980 | Clack et al. | 210/190 |
| 4,259,186 | 3/1981 | Boeing et al. | 210/286 |
| 4,260,487 | 4/1981 | Gruett | 210/190 |
| 4,336,134 | 6/1982 | Prior | 210/190 |
| 4,379,057 | 4/1983 | Meiser et al. | 210/662 |
| 4,539,106 | 9/1985 | Schwartz | 210/190 |
| 5,124,133 | 6/1992 | Schoenrock | 210/286 |
| 5,340,478 | 8/1994 | Strand et al. | 210/286 |
| 5,510,027 | 4/1996 | Tejeda | 210/286 |

*Primary Examiner*—Cynthia L. Nessler
*Attorney, Agent, or Firm*—Lathrop & Clark

[57] ABSTRACT

A salt dispenser for placement within a water softener brine tank has a cylindrical, rectangular or square plastic sleeve with multiple holes which allow the passage of water while retaining salt pellets. The salt dispenser is particularly advantageous for brine tanks which do not support the salt pellets or crystals above the bottom of the tank. The salt dispenser allows water to access the salt within the brine tank from all sides which leads to an even reduction in the height of the salt bed within the salt dispenser. Many water softener systems are supplied with brine tanks in which the salt rests directly on the bottom of the brine tank. Water is supplied to the brine tank by a float valve which also functions to allow brine to be withdrawn from the tank. After brine is withdrawn the float valve permits water to be added until a predetermined water level is reached. The introduction of water into the brine tank causes some of the salt pellet crystals to dissolve. Water is introduced from a single point the salt within the brine tank and the salt pellets can become steeply sloped towards the water inlet. The salt dispenser allows the water to access the salt within the brine tank from all sides and thereby leads to an even reduction in the height of the salt bed within the salt dispenser. The interior of the salt dispenser tank also may be divided by partitions or concentric sleeves.

12 Claims, 3 Drawing Sheets

WATER SOFTENER BRINE TANK INSERT

FIELD OF THE INVENTION

The present invention relates to water softeners in general and to brine tanks in particular.

BACKGROUND OF THE INVENTION

Water supplied by municipal water systems and surface and groundwater sources often contains dissolved minerals. When the dissolved minerals include calcium and magnesium carbonates and sulfates the water is said to be hard. Water hardness is measured in grains of hardness. Hardness resulting from calcium and magnesium ions produces insolvent compounds with soap which yields a grimy scum which is non-cleaning. The scum produced by the minerals in hard water leaves clothes gray and dingy and can make washing difficult, even leading to irritated and chapped skin. Of even greater concern than the precipitates formed with soap are the precipitates of carbonates when hard water is heated. The so called temporary hardness which is removed by heating hard water leaves a precipitate on the interior of hot water tanks. The precipitate acts as an insulator and thus reduces the efficiency of heat exchange between electric elements or hot combustion gases. A layer of scale only five hundredths of an inch thick can reduce heater efficiency by ten percent which—depending on hot water usage levels—may mount to over one-hundred dollars a year in lost heat.

Most of the United States, except for part of the Northwest and areas along the East Coast, have moderate to very hard water containing 3.5 to over 30 grains of hardness per gallon. Sodium ions including sodium carbonates and sulfates do not precipitate or form insoluble precipitate with soap. Water softeners employing ion exchange columns contain resin beads. The resin beads have a surface which attracts sodium, calcium and magnesium ions. The resin beads prefer calcium and magnesium ion and so if the bead surfaces are initially coated with sodium ions they will exchange sodium ions for calcium and magnesium ions, thus softening the water which flows through the ions exchange column. The column may be cleaned of calcium and magnesium ions and the surface of the beads resupplied with sodium ions by exposing the beads to a very high concentration of sodium ions. The conventional source of sodium ions is common salt i.e. sodium chloride. A brine tank containing salt crystals or pellets is partially flooded with water. The water dissolves the salt pellets and becomes sainted with salt. The saturated brine solution is then periodically run through the ion exchange column to regenerate the resin beads.

Ion exchange water softeners are regenerated typically after the passage of a fixed number of days or after the use of a fixed number of gallons of water. The process normally assumes that the brine solution used to regenerate the ion exchange column is uniformly saturated. If for any reason the brine consistency varies then regeneration may not take place often enough to prevent hard water from entering the water supply of a home or business, or on the other hand, the water softener may be set to regenerate more often than necessary. One typical approach to achieving uniform brine formation is to support the salt pellets above the bottom of the brine tank on a perforated plate. However many brine tanks are supplied without bottom supports because many suppliers of water softeners believe such supports are detrimental.

Water is introduced into the brine tank from a single source. Without a bottom support the salt in the brine tank is dissolved near the water inlet first so that the salt crystals or pellets slope down towards the water source. As the salt in the brine tank is used up the water may not be completely covered by salt.

What is needed is a way of causing the salt in a water softener brine tank to remain level as the salt is depleted.

SUMMARY OF THE INVENTION

The salt dispenser of this invention is positioned within a water softener brine tank. The salt dispenser consists of a cylindrical sleeve constructed of plastic with multiple holes formed in the sleeves. The holes are sized to allow the passage of water into and out of the salt dispenser while retaining salt pellets or crystals within the cylindrical sleeve. The salt dispenser is particularly advantageous used in brine tanks which do not support the salt pellets or crystals above the lower surface of the tank. For various reasons of cost or functionality many water softener systems are supplied with brine tanks in which the salt rests directly on the bottom of the brine tank. Water is supplied to the brine tank by a float valve which also functions to allow brine to be withdrawn from the tank. After brine is withdrawn the float valve permits water to be added until a predetermined water level is reached.

The introduction of water into the brine tank causes some of the salt pellet crystals to dissolve. Because water is introduced from a single point the salt within the brine tank can become steeply sloped towards the water inlet. This can result in uneven saturation in the brine within the tank as the salt level drops due to usage. The salt dispenser of this invention allows the water to access the salt within the brine tank from all sides and thereby leads to an even reduction in the height of the salt bed within the salt dispenser. The interior of the salt dispenser tank also may be divided by placing concentric cylindrical sleeves within the sleeve to form partitions which allow a column of salt to be built up to a considerable height even if only a limited amount of salt is introduced into the brine tank.

It is an object of the present invention to provide a salt dispenser which provides a more uniformly saturated brine solution.

It is another object of the present invention to provide an insert which can be used in a conventional brine tank to improve the uniform dispensing of brine solution to an ion exchange column.

It is a further object of the present invention to provide a means for conserving salt in an ion exchange water softener.

Further objects, features and advantages of the invention will be apparent from the following detailed description when taken in conjunction with the accompanying drawings.

DESCRIPTION OF THE PREFERRED EMBODIMENT

Figure 1:
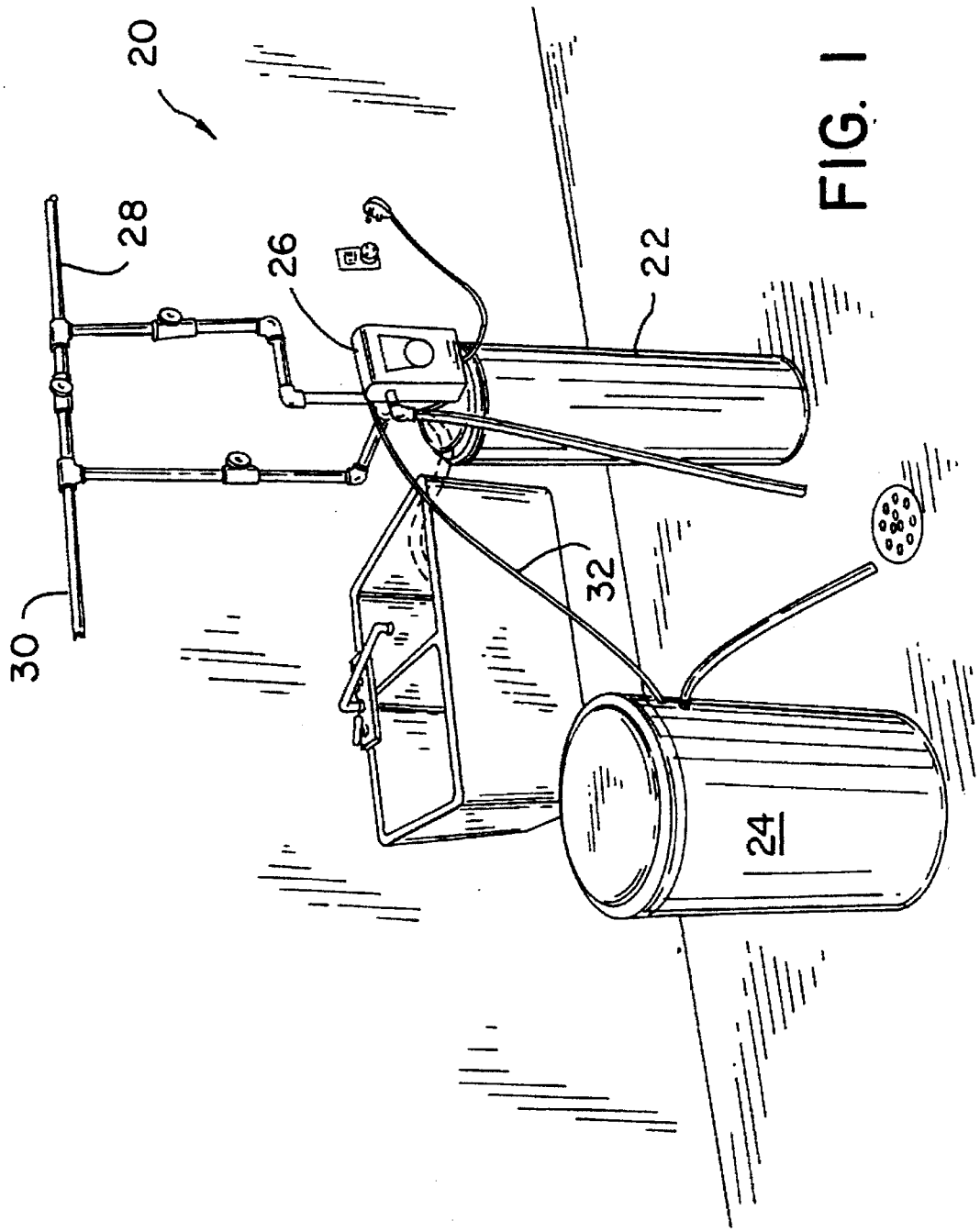
FIG. 1 is a perspective view of a typical water softening system as installed in a home.

Referring more particularly to FIGS. 1–5 wherein like numbers refer to similar parts a typical household water softening system 20 is shown in FIG. 1. The two major components of the water softening system 20 are an ion exchange column 22 and a brine tank 24. A controller 26 is mounted on the ion exchange column and normally directs hard water 28 through the ion exchange column 22 where the problem ions of calcium and magnesium are exchanged with sodium ions. The sodium ions do not precipitate upon heating and do not form in soluble compounds with soap. Soft water 30 leaves the ion exchange column 22 and is supplied to a hot water heater (not shown) and other household appliances. Periodically, after the passage of a selected number of days or the use of a selected quantity of water, the ion exchange column 22 is recharged. This is accomplished by passing a brine solution through the ion exchange column 22 which removes the accumulated calcium and magnesium ions and replaces them with sodium ions. The recharging of the ion exchange column 22 is controlled by the controller 26.

Figure 2:
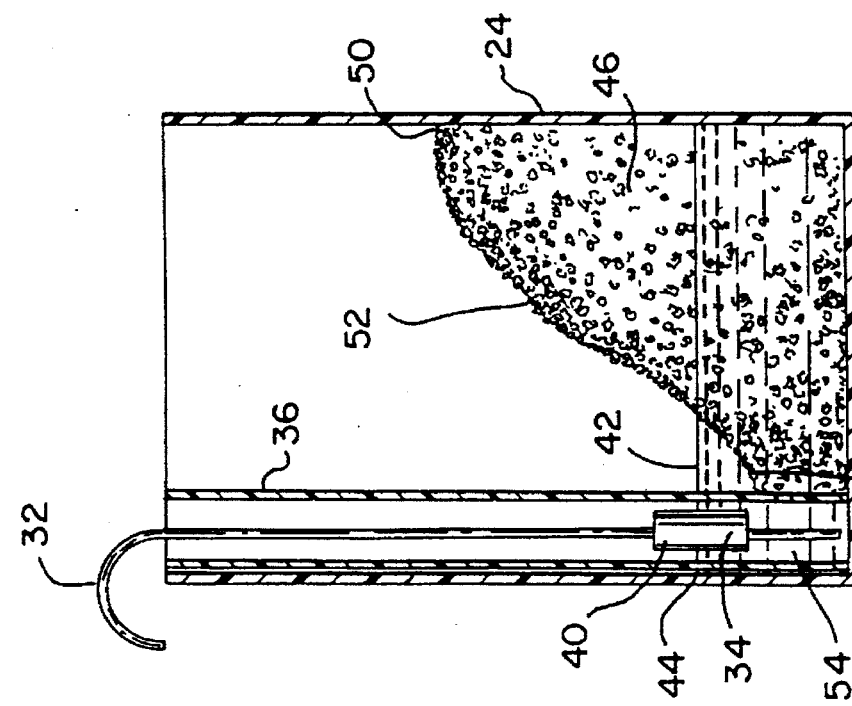
FIG. 2 is a cross-sectional view of a prior art water softener brine tank showing a buildup of salt away from the brine tank water supply.

A brine supply line 32 is connected to the controller 26, as shown in FIG. 1. The brine supply line 32 terminates at a float valve 34, as shown in FIG. 2. The brine float valve 34 is contained in a brine supply tube 36. The float valve 34 contains a check valve (not shown) which allows brine solution to be drawn from the brine tank 24. The float mechanism 40 opens the check valve when the water level 42 drops below a mechanical set point 44. The cycling of the controller first draws brine solution out of the brine tank 24. After the level of brine in the tank has been reduced by recharging the ion exchange column 22, the low level of remaining brine within the tank initiates, by means of the float valve 34, an in-flow of fresh water into the brine tank. This fresh water dissolves some of the granular salt 46.

A typical water softener will utilize about six pounds of salt per cycle and a brine tank will contain in the neighborhood of two to three hundred pounds of salt crystals or pellets when full. Over a period of months the salt 44 is gradually used up. As shown in FIG. 2, because the prior art apparatus introduces fresh water from a single location dictated by the position of the float valve 34, the salt level 48 adjacent the float valve 34 drops more rapidly then the salt level 50 which is most distant from the float valve 34. The sloping top 52 of the salt 44 shown in FIG. 2 can result in uneven saturation of the brine 54 in the brine tank 24. Nonuniformity in the brine 54 produced in the brine tank 24 may result in the ion exchange column 22 becoming depleted of sodium ions before the column is regenerated. Such failure can have expensive results if the efficiency of the water heater is reduced by scale production on the walls of the water heater. If the recycling time or number of gallons is reduced to assure continued hot water overuse of salt can result.

Figure 3:
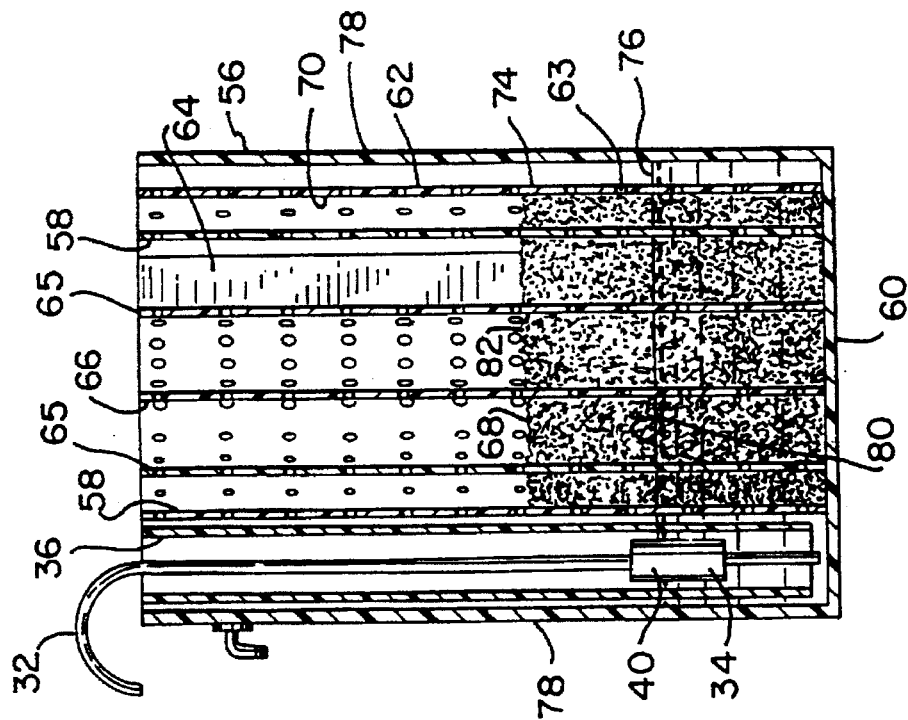
FIG. 3 is a cross-sectional view of a brine tank with the salt dispenser of this invention installed.
Figure 4:
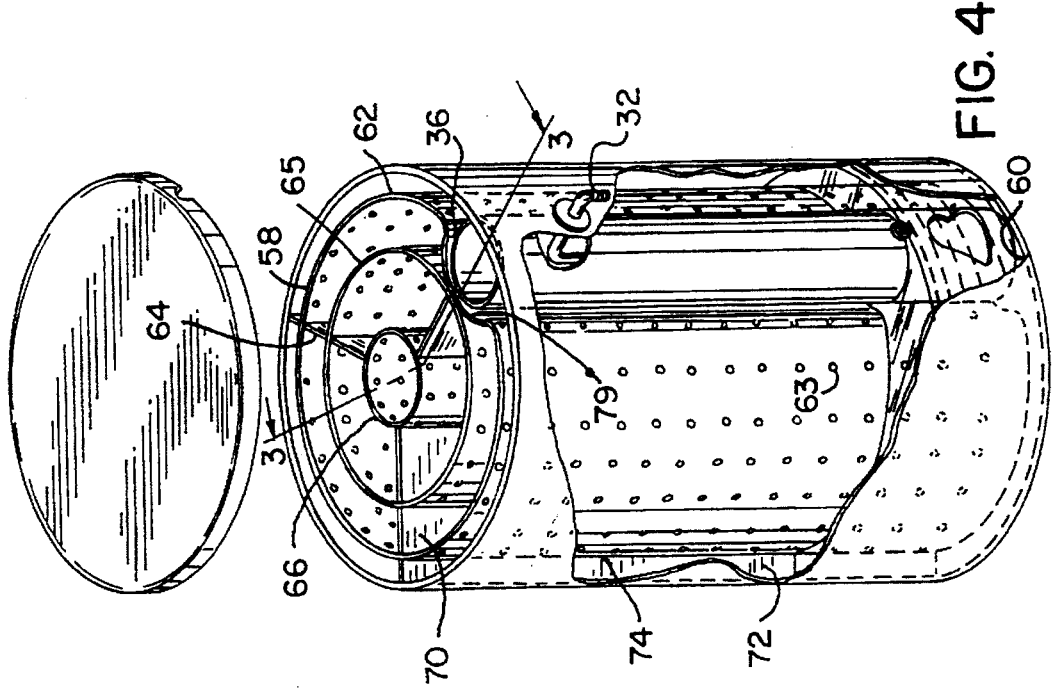
FIG. 4 is an isometric view, partially cut away in section, of the salt dispenser of FIG. 3.

The brine tank 56 shown in FIG. 3 has a salt dispenser 58 which rests on the bottom 60 of the brine tank 56. The salt dispenser 58, as shown in FIG. 4, has an outer cylindrical sleeve 62 which has a multiplicity of holes 63 which allow water to pass freely into and out of the sleeve 62. The dispenser 58 has concentric cylindrical sleeves 65 and 66 which are joined to the outer sleeve 62 by partition walls 64 which extend radially inward from the outer sleeve 62 to join the smaller inner cylindrical sleeves 65, 66. The concentric sleeves 65, 66 segregate the salt in the interior of the dispenser 58 within compartments 70. The inner concentric sleeves are foraminous, allowing the passage of brine through multiple holes similar to the holes 63 in the sleeve 62.

Salt 68 pellets or crystals are placed within the compartments 70 formed by the concentric sleeves 65, 66, and the cylindrical sleeve 62. The salt dispenser 58 has tabs 72 which project radially outwardly the outer wall 74 of the sleeve 62. The tabs 72 position the salt dispenser 58 so a narrow annulus 76 of one to one-and-a-half inches is created between the cylindrical wall 78 of the brine tank 56 and the outer surface 74 of the cylindrical sleeve 62. The outer cylindrical sleeve 62 has an indentation 79 which accommodates the supply tube 36. The multiple holes 63 in the salt dispenser 58 allow water from the supply line 32 to flow through the float valve 34 and access the salt 68 from all sides. Water which penetrates the cylindrical sleeve 62 comes into contact with the salt 68 stored in the salt dispenser 58 and dissolves the salt. The uniform access of the water 80 to the salt through the annulus 76 results in a more even use of salt 60 contained in the salt dispenser 58. Thus the upper surface 82 of the salt 68 within the salt dispenser 58 remains more nearly level.

Figure 5:
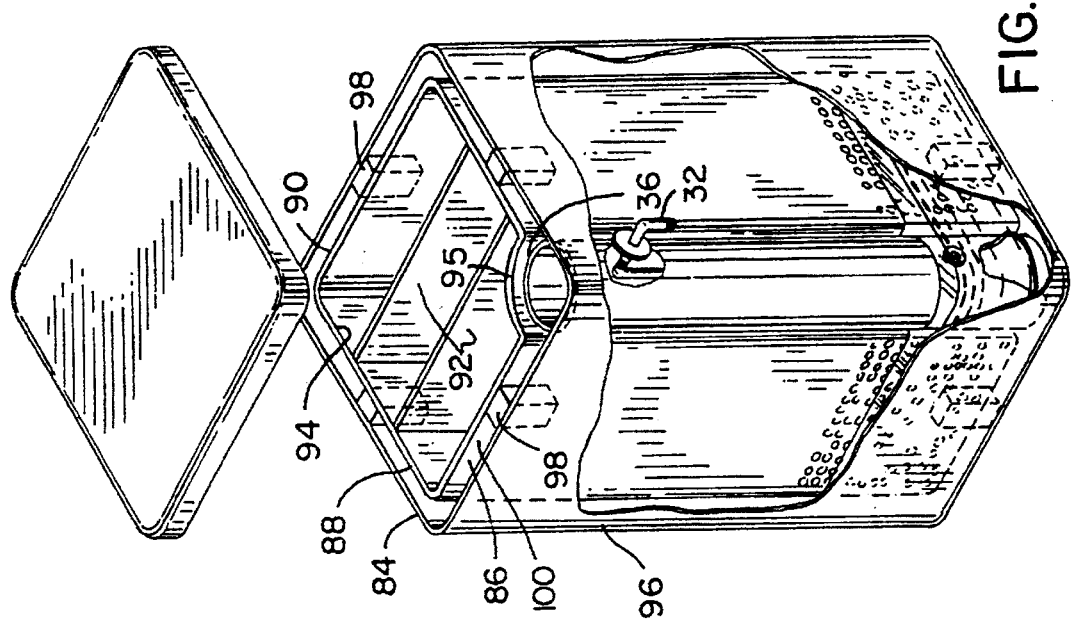
FIG. 5 is an isometric view, partially cut-away in section, of an alternative embodiment salt dispenser of this invention within a brine tank.

Some brine tanks are rectangular, such as the brine tank 84 shown in FIG. 5. An alternative embodiment salt dispenser 86 for the brine tank 84 has a sleeve 88 which is in the form of a rectangle 90. The rectangular sleeve 88 has partitioning walls 92 which divide the salt dispenser 86 into a number of rectangular compartments 94. A indentation 95 in the sleeve 88 provides space for the supply tube 36. Salt (not shown) is placed within the compartments 94. Tabs 98 on the exterior 100 of the sleeve 88 space the sleeve from the walls 96 of the brine tank 84. Water which circulates between the rectangular tank walls 96 dissolves the salt held in the compartments 94, thus assuring more even use of the salt contained within the brine tank 84.

It should be understood that brine tanks of varying configurations from square to rectangular and including circular and oblong tanks could be used with salt dispensers of compatible shape.

It should also be understood that float valves of varying configurations and actuation mechanisms can be used to control the water level in brine tanks employing the salt dispenser described herein. Furthermore, the salt dispensers 58, 86 or one of similar configuration could be used with most if not all water softener brine tanks currently on the market.

It is understood that the invention is not limited to the particular construction and arrangement of parts herein illustrated and described, but embraces such modified forms thereof as come within the scope of the following claims.

I claim:

1. A water softener brine tank assembly comprising:
   a) a tank having a bottom and side walls which extend upwardly from the bottom to enclose an upwardly opening volume, the tank containing salt brine;
   b) a water inlet positioned near the bottom of the tank, the inlet incorporating a float valve which maintains water at a fixed level within the tank by introducing water until the float valve closes; and
   c) a means for holding salt within the brine tank, the means including a plastic sleeve positioned within the brine tank, the sleeve being substantially spaced from the side walls of the tank and substantially parallel to the side walls of the tank, wherein the sleeve abuts the tank bottom and the sleeve defines an interior volume containing salt, and portions of the sleeve define a multiplicity of openings through which water can pass, thereby permitting the passage of water from the water tank through the sleeve into the sleeve interior; and d) a baffle means disposed in said sleeve for dividing said sleeve into at least two compartments for containing said salt.

2. The water softener brine tank assembly of claim 1 wherein the tank is rectangular and the sleeve has multiple planar walls which define a substantially upright rectangular volume.

3. The water softener brine tank assembly of claim 1 wherein the tank defines a substantially right cylindrical shape and wherein the sleeve is substantially a right cylinder having a substantially cylindrical exterior wall which is spaced from the tank side walls.

4. The water softener brine tank assembly of claim 3 wherein the sleeve is divided by the baffle means into the at least two individual compartments by at least one concentric inner sleeve.

5. The water softener brine tank assembly of claim 3 wherein the baffle means includes an inner sleeve positioned within the sleeve exterior wall, the inner sleeve being joined to the exterior wall by at least two radial baffles which extend vertically to partition the sleeve into a plurality of vertically extending compartments.

6. The water softener brine tank assembly of claim 1 wherein a plurality of tabs extend outwardly from the sleeve to space the sleeve from the side walls of the tank.

7. A water softener brine tank of the type having a tank bottom and upwardly extending side walls defining a receptacle for holding granular solid salt and further having a float valve connected to a source of water wherein the tank has no structure overlying the tank bottom for supporting granular salt spaced from the bottom, wherein the improvement comprises:

a sleeve positioned within the brine tank, the sleeve being spaced at all points from the side walls of the tank and extending substantially parallel to the side walls of the tank, and the sleeve abutting the tank bottom, and wherein the sleeve defines an opened ended container, containing a quantity of salt, and wherein the sleeve has portions defining a multiplicity of openings forming a means for the passage of water from the tank into the container; and a baffle means disposed in said sleeve for dividing said sleeve into at least two compartments for containing said salt.

8. The water softener brine tank of claim 7 wherein the tank is rectangular and the sleeve has multiple walls forming a substantially upright rectangular container for salt.

9. The water softener brine tank of claim 7 wherein the tank has a substantially right cylindrical side walls, and wherein the sleeve defines a substantially right cylindrical shape having a cylindrical exterior wall spaced at least about 1 inch from the tank side walls.

10. The water softener brine tank of claim 9 wherein the cylindrical sleeve is divided by the baffle means into the at least two individual salt compartments by at least one concentric cylindrical sleeve.

11. The water softener brine tank of claim 9 wherein the baffle means includes positioned within the cylindrical sleeve an inner sleeve which is joined to the cylindrical sleeve by at least two radial baffles which form vertical partitions within the sleeve.

12. The water softener brine tank of claim 7 wherein a plurality of tabs extend outwardly from the sleeve to position the sleeve spaced from the side walls of the tank.

* * * * *